(12) United States Patent
Kwon et al.

(10) Patent No.: US 12,475,544 B2
(45) Date of Patent: Nov. 18, 2025

(54) IMAGE RESTORATION METHOD AND APPARATUS

(71) Applicant: SAMSUNG ELECTRONICS CO., LTD., Suwon-si (KR)

(72) Inventors: Kinam Kwon, Suwon-si (KR); Eunhee Kang, Suwon-si (KR); Sangwon Lee, Seongnam-si (KR); Sujin Lee, Yongin-si (KR); Hyongeuk Lee, Suwon-si (KR); Jaeseok Choi, Yongin-si (KR); Byungin Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 17/241,701

(22) Filed: Apr. 27, 2021

(65) Prior Publication Data
US 2022/0138924 A1     May 5, 2022

(30) Foreign Application Priority Data

Oct. 30, 2020    (KR) ........................ 10-2020-0143565

(51) Int. Cl.
*G06T 7/00*     (2017.01)
*G06T 5/70*     (2024.01)
*G06T 5/73*     (2024.01)

(52) U.S. Cl.
CPC .............. *G06T 7/0002* (2013.01); *G06T 5/70* (2024.01); *G06T 5/73* (2024.01)

(58) Field of Classification Search
CPC ........ G06T 7/0002; G06T 5/002; G06T 5/003
See application file for complete search history.

(56) References Cited

U.S. PATENT DOCUMENTS

| | | | |
|---|---|---|---|
| 7,856,055 B2 | 12/2010 | Zhou et al. | |
| 9,756,284 B2 | 9/2017 | Zhang et al. | |
| 11,272,106 B1 | 3/2022 | Lee et al. | |
| 11,368,617 B2 * | 6/2022 | Zhou | ........................ G06T 5/50 |
| 2016/0117806 A1 | 4/2016 | Hayashi et al. | |
| 2020/0364834 A1 * | 11/2020 | Ferrés | ........................ G06T 5/60 |
| 2021/0104021 A1 * | 4/2021 | Sohn | ........................ G06T 5/70 |
| 2021/0152735 A1 * | 5/2021 | Zhou | ........................ G06T 5/003 |

(Continued)

FOREIGN PATENT DOCUMENTS

| | | | | |
|---|---|---|---|---|
| EP | 3992904 A1 * | 5/2022 | ............. | G06N 3/045 |
| JP | 2009-271725 A | 11/2009 | | |

(Continued)

OTHER PUBLICATIONS

IEEE Transactions on image processing, vol. 27, No. 9, Sep. 2018, FFDNet: Toward a Fast and Flexible Solution for CNN-Based Image Denoising (Year: 2018).*

Zhigang Zhou et al. / Optik 125 (2014) 1795-1799, Global brightness and local contrast adaptive enhancement for low illumination color image (Year: 2014).*

(Continued)

*Primary Examiner* — Gandhi Thirugnanam
(74) *Attorney, Agent, or Firm* — NSIP Law

(57) ABSTRACT

An image restoration method includes determining degradation information indicating a degradation factor of a degraded image, tuning the degradation information based on a tuning condition, and generating a restored image corresponding to the degraded image by executing an image restoration network with the degraded image and the degradation information.

18 Claims, 12 Drawing Sheets

(56) References Cited

U.S. PATENT DOCUMENTS

| | | | | |
|---|---|---|---|---|
| 2021/0241428 | A1* | 8/2021 | Mansour | G06T 5/73 |
| 2022/0067889 | A1* | 3/2022 | Kang | G06T 5/003 |
| 2022/0138924 | A1* | 5/2022 | Kwon | G06T 5/003 |
| | | | | 382/275 |
| 2022/0148130 | A1* | 5/2022 | Tang | G06T 3/4053 |
| 2022/0159188 | A1* | 5/2022 | Lee | H04N 5/2254 |
| 2022/0237744 | A1* | 7/2022 | Kwon | G06N 3/082 |
| 2022/0270225 | A1* | 8/2022 | Pham | G06T 5/002 |
| 2023/0071693 | A1* | 3/2023 | Kang | G06T 5/003 |
| 2023/0103966 | A1* | 4/2023 | Choi | G06T 5/70 |
| | | | | 382/100 |
| 2024/0020808 | A1* | 1/2024 | Yoo | G06T 5/20 |

FOREIGN PATENT DOCUMENTS

| | | | |
|---|---|---|---|
| KR | 10-2005-0002979 | A | 1/2005 |
| KR | 10-2005-0011241 | A | 1/2005 |
| KR | 10-2009-0028257 | A | 3/2009 |
| KR | 10-1313911 | B1 | 10/2013 |
| KR | 10-2015-0028374 | A | 3/2015 |
| KR | 10-2018-0001428 | A | 1/2018 |
| KR | 10-2018-0034027 | A | 4/2018 |
| KR | 10-1871098 | B1 | 6/2018 |
| KR | 10-2019-0114340 | A | 10/2019 |
| KR | 10-2020-0073078 | A | 6/2020 |

OTHER PUBLICATIONS

Yuqian Zhou et al., Image Restoration for Under-Display Camera, University of Illinois at Urbana-Champaign, University of California, Berkeley, Microsoft Corporation, arXiv:2003.04857v1 [cs.CV] Mar. 10, 2020 (Year: 2020).*

Zhang, K., "FFDNet: Toward a Fast and Flexible Solution for CNN-Based Image Denoising", 2017, https://arxiv.org/abs/1710.04026v1, (Year: 2017) (Year: 2017).*

Sethumadhavan, Hrishikesh Panikkasseril, et al., "Transform Domain Pyramidal Dilated Convolution Networks for Restoration of Under Display Camera Images", European Conference on Computer Vision. Springer, Cham, 2020. (15 pages in English).

Zhou, Yuqian, et al., "Image Restoration for Under-Display Camera", arXiv preprint arXiv:2003.04857, Mar. 10, 2020, (17 pages in English).

Extended European search report issued on Dec. 22, 2021, in counterpart European Patent Application No. 21185124.1 (9 pages in English).

Chinese Office Action issued on Nov. 4, 2024, in counterpart Chinese Patent Application No. 202110684429.7 (18 pages in English, 10 pages in Chinese).

Korean Office Action Issued on Jan. 31, 2025, in Counterpart Korean Patent Application No. 10-2020-0143565 (3 Pages in English, 5 Pages in Korean).

* cited by examiner

IMAGE RESTORATION METHOD AND APPARATUS

CROSS-REFERENCE TO RELATED APPLICATIONS

This application claims the benefit under 35 USC § 119(a) of Korean Patent Application No. 10-2020-0143565 filed on Oct. 30, 2020, in the Korean Intellectual Property Office, the entire disclosure of which is incorporated herein by reference for all purposes.

BACKGROUND

1. Field

The following description relates to an image restoration method and apparatus.

2. Description of Related Art

A camera, a device configured to capture an image, is provided in various electronic devices. A camera has become an essential part of a mobile device such as a smartphone and has become higher in performance and smaller in size as time passes. In general, a smartphone includes a front camera and a rear camera. The front camera is arranged in the upper region of the smartphone and is frequently used to capture a selfie. An under-display camera (UDC) system provides a camera that is hidden behind a display panel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented image restoration method includes receiving a degraded image, determining degradation information indicating a degradation factor of the degraded image, tuning the degradation information based on a tuning condition, and generating a restored image corresponding to the degraded image by executing an image restoration network with the degraded image and the degradation information.

The degradation information may include at least one or both of a noise parameter and a blur parameter. The tuning condition may include a user preference for a level of removal of the degradation factor. The generating of the restored image may include inputting, to the image restoration network, input data corresponding to the degraded image, and adjusting output data of at least one layer of the image restoration network using map data corresponding to the degradation information.

The determining of the degradation information may include determining a noise parameter indicating a level of noise included in the degraded image by analyzing the degraded image. The tuning of the degradation information may further include tuning the noise parameter based on environment information of the degraded image. The tuning of the noise parameter may include tuning the noise parameter such that the noise parameter indicates a high noise level in response to the environment information corresponding to a low-illumination environment, and tuning the noise parameter such that the noise parameter indicates a low noise level in response to the environment information corresponding to a high-illumination environment.

The degraded image may be captured by a camera, the camera may be an under-display camera (UDC), and the determining of the degradation information may include obtaining a blur parameter corresponding to a hardware characteristic of the UDC. The UDC may receive light through holes arranged between display pixels of a display panel. The hardware characteristic may include one or more of a size, a shape, a depth, and an arrangement pattern of the holes. The blur parameter may include one or more of a first parameter indicating a blur intensity, a second parameter indicating an interval between artifacts, and a third parameter indicating an intensity of the artifacts.

In another general aspect, an image restoration apparatus includes a processor; and a memory including instructions executable in the processor. When the instructions are executed in the processor, the processor may receive a degraded image, determine degradation information indicating a degradation factor of the degraded image, tune the degradation information based on a tuning condition, and generate a restored image corresponding to the degraded image by executing an image restoration network with the degraded information and the degradation information.

In another general aspect, an electronic device includes a camera, and a processor configured to receive a degraded image from the camera, determine degradation information indicating a degradation factor of the degraded image, tune the degradation information based on a tuning condition, and generate a restored image corresponding to the degraded image by executing an image restoration network with the degraded image and the degradation information.

In another general aspect, an electronic device includes a camera and a processor configured to receive a degraded image captured by the camera, estimate an amount of noise included in the degraded image through a noise parameter that represents noise information of each pixel in the degraded image, and generate a restored image by executing a deep neural network based on the degraded image and the noise parameter.

The processor may be configured to generate the restored image by removing a noise component corresponding to the noise parameter from the degraded image.

The processor may be configured to generate a noise map corresponding to the noise parameter and input the noise map to the deep neural network to adjust an output of a layer of the deep neural network.

The processor may be configured to tune the noise parameter based on a tuning condition and apply the tuned noise parameter to the deep neural network.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
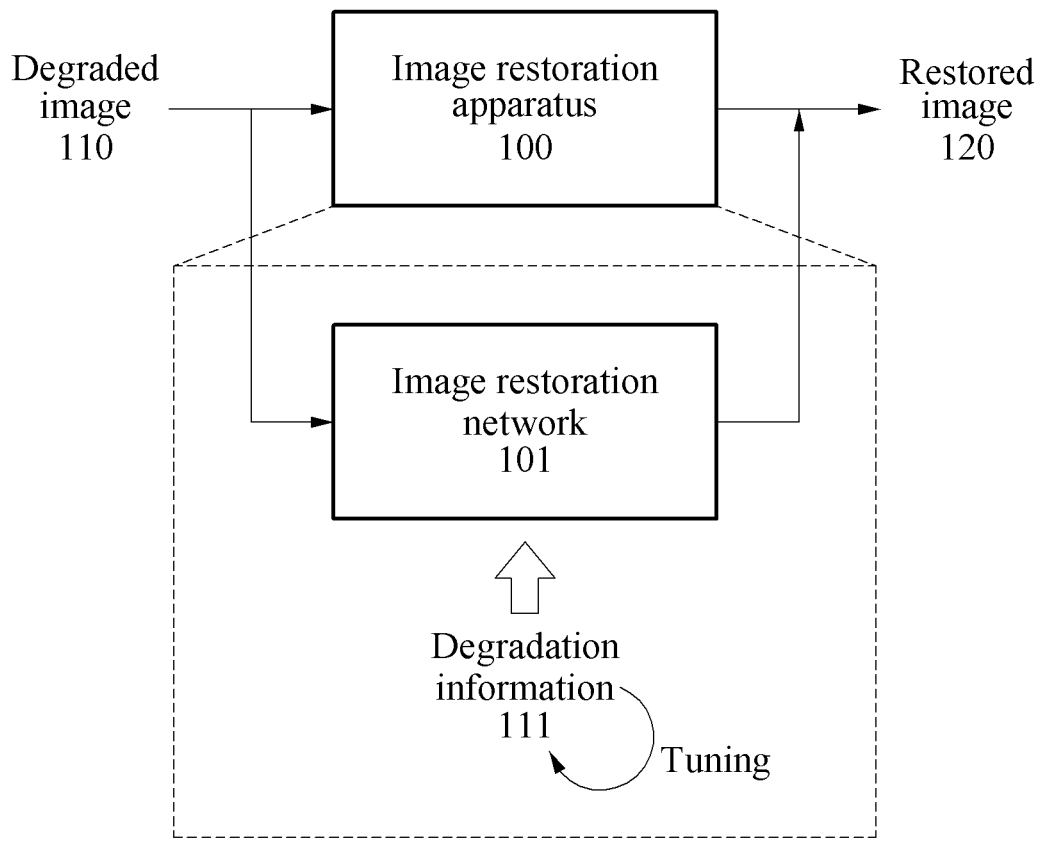
FIG. 1 illustrates an example of image restoration.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Also, in the descriptions of the various examples, detailed description of structures or functions that are thereby known after an understanding of the disclosure of the present application will be omitted when it is deemed that such description will be redundant.

Hereinafter, examples will be described in detail with reference to the accompanying drawings, and like reference numerals in the drawings refer to like elements throughout.

FIG. 1 illustrates an example of image restoration. Referring to FIG. 1, an image restoration apparatus 100 may remove degradation factors that degrade an image quality from a degraded image 110 through image restoration to generate a restored image 120. The image restoration apparatus 100 may remove the degradation factors based on a cause and a pattern of degradation that is specific to the degraded image 110. For example, the degraded image 110 may be an image from an under-display camera (UDC) (hereinafter simply a UDC image). In this example, a degradation factor specific to the UDC may be considered for image restoration.

The image restoration apparatus 100 includes an image restoration network 101. The image restoration network 101 may be a deep neural network (DNN) including a plurality of layers. The layers may include an input layer, a hidden layer, and an output layer. A neural network described herein may include, for example, a fully-connected network (FCN), a convolutional neural network (CNN), and a recurrent neural network (RNN). For example, a portion of layers included in the neural network may correspond to a CNN, and another portion of the layers may correspond to an FCN. In this example, the CNN may be referred to as a convolutional layer, and the FCN may be referred to as a fully-connected layer. The neural network may include a residual connection.

In a case of the CNN, data input to each layer may be referred to as an input feature map, and data output from each layer may be referred to as an output feature map. The input feature map and the output feature map may also be referred to as activation data. For example, when the convolutional layer corresponds to an input layer, an input feature map of the input layer may be an input image.

After trained based on deep learning, the neural network may perform an inference that is suitable for a purpose for the training by mapping input data and output data that are in a nonlinear relationship to each other. Here, deep learning refers to a machine learning method used to solve an issue such as image or speech recognition from a big data set. Deep learning may also be construed as an optimized problem-solving process that finds a point at which energy is minimized while training the neural network using prepared training data.

Through supervised or unsupervised learning of deep learning, a weight corresponding to an architecture of the neural network or a model may be obtained. Through such a weight, the input data and the output data may be mapped. When the neural network has a sufficiently great width and depth, the neural network may have a capacity that is sufficient to implement a function. When the neural network learns a sufficiently great amount of training data through an appropriate training process, the neural network may achieve optimal performance.

The neural network may be expressed as being trained in advance, in which "in advance" means "before" the neural network is started. Here, that the neural network is started means that the neural network is ready for an inference. For example, that the neural network is started may mean that the neural network is loaded in a memory, or input data for an inference is input to the neural network after the neural network is loaded in the memory.

As illustrated, the image restoration apparatus 100 may determine degradation information 111 indicating a degradation factor of the degraded image 110, and generate the restored image 120 by executing the image restoration network 101 with the degraded image 110 and the degradation information 111. For example, the degradation information 111 may include a noise parameter indicating a noise factor in the degraded image 110 and a blur parameter indicating a blur factor in the degraded image 110. As the image restoration network 101 is executed, an inference of the image restoration network 101 may be performed.

The image restoration apparatus 100 may generate the restored image 120 by inputting the degraded image 110 and the degradation information 111 as input data to the image restoration network 101. Alternatively, the image restoration apparatus 100 may generate the restored image 120 by inputting the degraded image 110 as input data to the image restoration network 101 and adjusting an output of a layer of the image restoration network 101 based on the degradation information 111. For example, the image restoration apparatus 100 may adjust an output of a layer of the image restoration network 101 using map data corresponding to the degradation information 111. In this example, the image restoration network 101 may use information of the restored image 120 through an attention mechanism.

The image restoration apparatus 100 may tune the degradation information 111 based on a tuning condition and use information obtained through the tuning. Here, the tuning may include scaling that scales a parameter value of the degradation information 111 by a ratio, addition that adds a value to the parameter value, clipping that limits the parameter value to a value, and allocation that allocates a specific value as the parameter value. For example, for noise removal, environment information associated with an environment in which the degraded image 110 is captured may be used as the tuning condition. For example, in a case of removing noise of the degraded image 110 with a single neural network when the degraded image 110 is captured in various environments, noise may not be appropriately removed depending on an intensity of noise. For example, in a case of over-smoothing restoration, for example, when removing noise from a high-illumination image with a neural network trained to remove noise from a low-illumination image, over-smoothing may occur. In contrast, in a case of removing noise from a low-illumination image with a neural network trained to remove noise from a high-illumination image, noise may remain in the image.

Thus, instead of using the image restoration network 101 as a single neural network, the image restoration apparatus 100 may tune the degradation information 111 according to a situation and then use the information obtained through the tuning. For example, in a case in which the degraded image 110 is captured in a low-illumination environment, the image restoration apparatus 100 may tune the degradation information 111 such that the image restoration network 101 removes a greater amount of noise to prevent the noise from being left in the degraded image 110. In a case in which the tuning is performed through scaling or addition such that a noise parameter indicates a high noise level, the image restoration network 101 may consider that a greater amount of noise, than an actual amount, is present in the degraded image 110, and may perform a noise removal operation corresponding to the greater amount of noise. In contrast, in a case in which the degraded image 110 is captured in a high-illumination environment, the image restoration apparatus 100 may tune a noise parameter such that the noise parameter indicates a low noise level to prevent over-smoothing.

Alternatively, a user's preference for a level of removal of the degradation factor may be used as the tuning condition. The user's preference will be referred to hereinafter as a user preference for a simpler expression. For example, a user may prefer a vintage-style image with noise, and another user may prefer a clean image with almost no noise. For another example, a user may prefer a soft image with some blurs, and another user may prefer a sharp image with almost no blurs. Thus, the user preference may include a preferred noise level and a preferred blur level. The image restoration apparatus 100 may adjust a noise parameter and/or a blur parameter based on the user preference, and a level of removal of noise and/or a blur by the image restoration network 101 may be adjusted accordingly.

Figure 2:
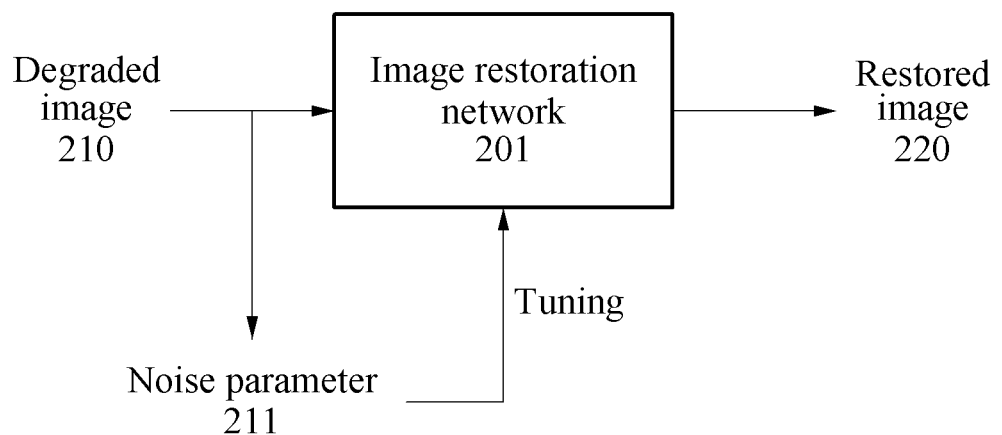
FIG. 2 illustrates an example of restoring a degraded image using a noise parameter.

FIG. 2 illustrates an example of restoring a degraded image using a noise parameter. Referring to FIG. 2, an image restoration apparatus may analyze a degraded image 210 to estimate a noise level which is a level of noise included in the degraded image 210. The image restoration apparatus may estimate the noise level through a noise parameter 211. For example, the image restoration apparatus may represent the noise level by a normal distribution N(0, σ), in which σ denotes the noise parameter 211. The noise parameter 211 may represent noise information of each pixel through a parameter value corresponding to each pixel in the degraded image 210. For example, a first parameter value σ1 indicating a noise level of a first pixel in the degraded image 210 may differ from a second parameter value σ2 indicating a noise level of a second pixel in the degraded image 210.

The image restoration apparatus may generate a restored image 220 by executing an image restoration network 201 based on the degraded image 210 and the noise parameter 211. For example, the image restoration network 201 may generate the restored image 220 by removing, from the degraded image 210, a noise component corresponding to the noise parameter 211. To this end, the noise parameter 211 may be transformed into a form of a map. That is, the image restoration apparatus may generate a noise map corresponding to the noise parameter 211, and the image restoration network 201 may adjust an output of a layer (e.g., an input layer, a hidden layer, or an output layer) of the image restoration network 201 using the noise map. For example, the image restoration network 201 may remove a noise component indicated through the noise map in the output using an operation between the output and the noise map. The noise parameter 211 may indicate a noise level of each pixel in the degraded image 210, and thus be transformed into a noise map representing spatial information.

The image restoration apparatus may tune the noise parameter 211 based on a tuning condition and apply the tuned noise parameter 211 to the image restoration network 201. In a case of using a noise map, the tuning of the noise parameter 211 may include tuning the noise map. That is, the image restoration apparatus may tune the noise parameter 211 based on the tuning condition, transform the tuned noise parameter 211 into the noise map, and then apply the noise map to the image restoration network 201. Alternatively, the image restoration apparatus may transform the noise parameter 211 into the noise map and then tune the noise map based on the tuning condition.

The tuning condition may include environment information of the degraded image 210 and/or a user preference. The image restoration apparatus may determine the environment information through metadata of the degraded image 210. For example, the environment information may include illumination information indicating an illumination at which the degraded image 210 is captured. The image restoration apparatus may classify an illumination higher than a threshold value as a high illumination, and an illumination lower than the threshold value as a low illumination. The low illumination may be construed as a level of illumination at which light is so little that a person has a difficulty in identifying objects. The high illumination is a term that is provided to distinguish from the low-illumination condition, and may not necessarily mean an extremely high illumination that may generate saturation, but mean a general level of illumination at which a person is able to identify objects with ease. The high illumination may thus be referred to as a general illumination. The user preference may be stored as a setting value in the image restoration apparatus. For example, the user preference may include a preferred noise level and a preferred blur level.

Figure 3:
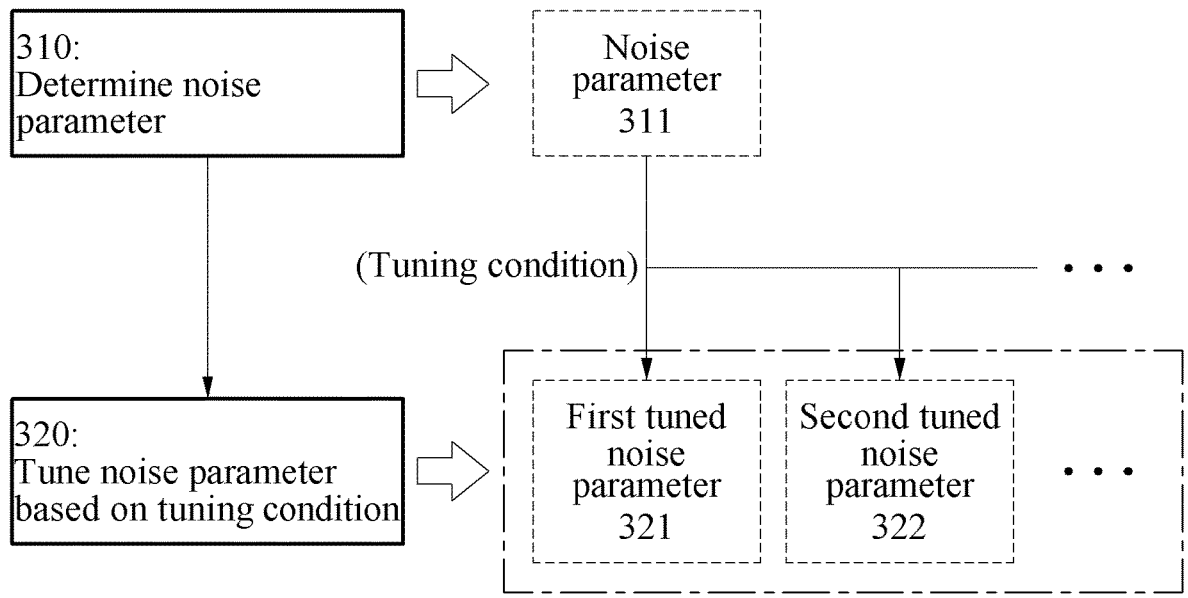
FIG. 3 illustrates an example of tuning a noise parameter.

FIG. 3 illustrates an example of tuning a noise parameter. Referring to FIG. 3, an image restoration apparatus determines a noise parameter 311 in operation 310, and tunes the noise parameter 311 based on a tuning condition in operation 320. Degradation information may include a blur parameter in addition to the noise parameter 311, and thus the following description of the noise parameter 311 may also be applied to the blur parameter.

The image restoration apparatus may determine a first tuned noise parameter 321 by tuning the noise parameter 311 based on a first tuning condition, and determine a second tuned noise parameter 322 by tuning the noise parameter 311 based on a second tuning condition. The image restoration apparatus may execute an image restoration network with the first tuned noise parameter 321 and/or the second tuned noise parameter 322 instead of using the noise parameter 311. Thus, it is possible to have an effect of applying different data to the image restoration network depending on the tuning condition.

In an example, the tuning condition may include environment information. For example, in a case in which the environment information corresponds to a low-illumination environment, the image restoration apparatus may tune the noise parameter 311 such that the noise parameter 311 indicates a high noise level. In this example, the first tuned noise parameter 321 may be determined. For example, in a case in which the environment information corresponds to a low-illumination environment, the image restoration apparatus may tune the noise parameter 311 such that the noise parameter 311 indicates a low noise level. In this example, the second tuned noise parameter 322 may be determined. For example, when the noise parameter 311 indicates 10% noise, the first tuned noise parameter 321 may indicate 15% noise and the second tuned noise parameter 322 may indicate 5% noise. The noise parameter 311 may include different parameter values for respective pixels in a degraded image, and thus each of 10%, 15%, and 5% noise may indicate the average noise of the entire image. The image restoration apparatus may adjust a parameter value of each pixel by a ratio to adjust an average 10% noise to 15% or 5% noise. Thus, in response to the first tuned noise parameter 321, the image restoration network may remove a greater amount of noise from the degraded image.

In another example, the tuning condition may include a user preference. For example, the user preference may include a preferred noise level and a preferred blur level. The image restoration apparatus may tune the noise parameter 311 based on the preferred noise level. For example, in a case in which a user prefers an image that looks old with noise, the image restoration apparatus may tune the noise parameter 311 such that the noise parameter 311 indicates a low noise level. In a case in which a user prefers a clean image with almost no noise, the image restoration apparatus may tune the noise parameter 311 such that the noise parameter 311 indicates a high noise level. In still another example, the tuning condition may include both the environment information and the user preference, and the image restoration apparatus may tune the noise parameter 311 based on the two conditions.

In a case of using a noise map, the image restoration apparatus may generate a noise map corresponding to the noise parameter 311, and then tune the noise map to determine the tuned noise map. Alternatively, the image restoration apparatus may tune the noise parameter 311, and then determine a tuned noise map corresponding to the tuned noise parameter 311. The image restoration network may remove noise from the degraded image using the tuned noise map. In addition, a blur parameter may be transformed into a form of a map such as a blur map. The foregoing description of the noise parameter 311 may also be applicable to the blur parameter and/or the blur map.

Figure 4:
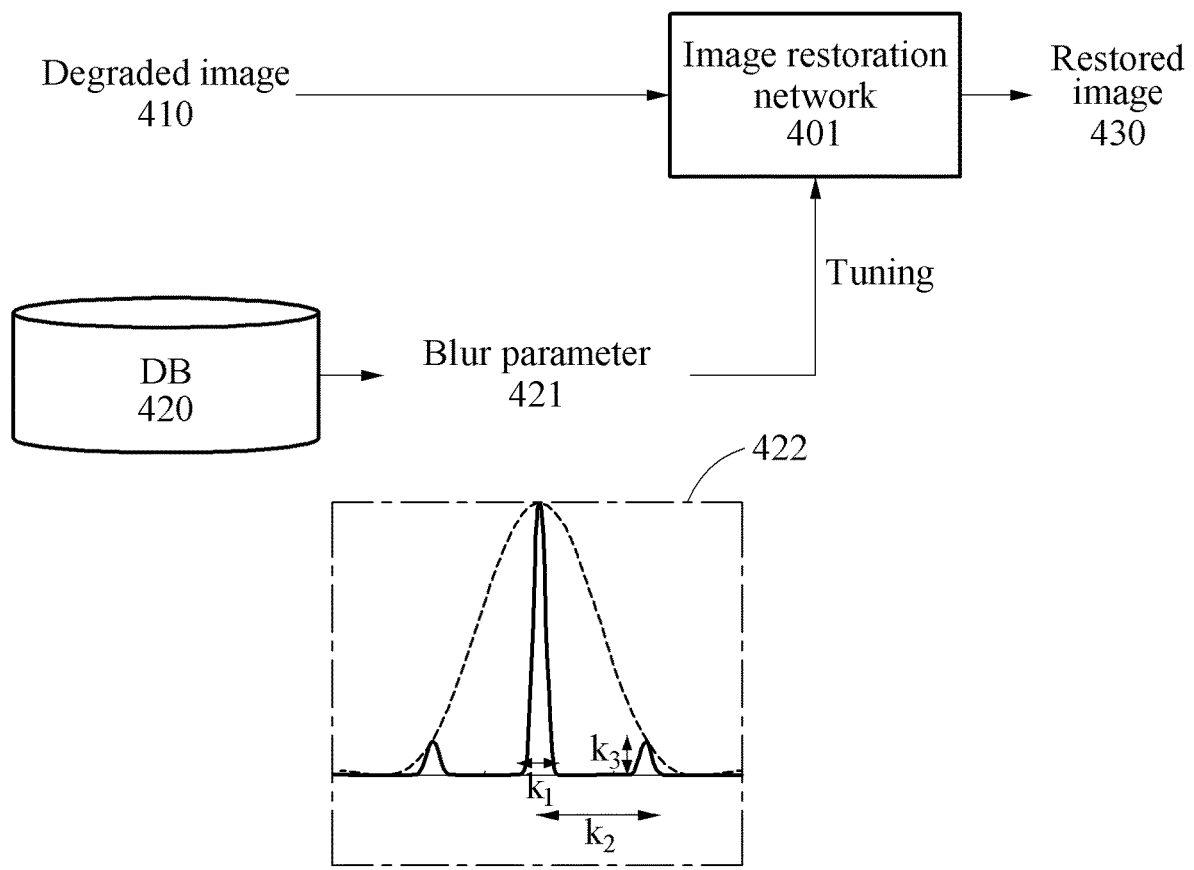
FIG. 4 illustrates an example of restoring a degraded image using a blur parameter.

FIG. 4 illustrates an example of restoring a degraded image using a blur parameter. Referring to FIG. 4, an image restoration apparatus may obtain a blur parameter 421 from a database (DB) 420. For example, in a case in which a degraded image 410 is a UDC image, the DB 420 may store databased sample blur parameters according to a hardware characteristic of each of various UDCs. A blur of an image generated by a UDC may be dependent on a hardware characteristic of the UDC. For example, the hardware characteristic of the UDC may include at least one of a size, a shape, a depth, or an arrangement pattern of holes. The arrangement pattern of the holes may include an interval between neighboring holes. As to be described hereinafter with reference to FIGS. 10 and 11, a UDC may generate an image by receiving light through holes arranged between display pixels, and the holes may act as multi-slits generating a blur in the image.

A hardware characteristic of each UDC may be determined through design data or ground truth (GT) data. Through a simulation based on such a hardware characteristic, a point spread function (PSF) for each pixel in a sample UDC image may be determined. Each sample blur parameter in the DB 420 may be determined based on a characteristic of a PSF. For example, when a sample image without a blur corresponds to GT, a sample UDC image with a blur may correspond to a result of a convolution operation between each pixel of the GT and a corresponding PSF. A sample blur parameter of each UDC may be determined using GT, a sample UDC image, and a corresponding relationship and deconvolution based on a PSF of each pixel.

Unlike a noise parameter that varies according to a variable capturing environment, the blur parameter 421 may be dependent on an invariable hardware characteristic and may thus have a consistent value. Thus, the image restoration apparatus may obtain and use the blur parameter 421 suitable for a hardware characteristic of a UDC generating the degraded image 410. However, the blur parameter 421 may not need to be necessarily obtained repeatedly each time of restoration of the degraded image 410. Thus, the image restoration apparatus may continuously use the blur parameter 421 that is previously obtained without additionally obtaining it after obtaining the blur parameter 421 from the DB 420. For example, in a case in which there are UDCs having different hardware characteristics, the image restoration apparatus may perform image restoration by applying different blur parameters, instead of using an image restoration network 401 as a single neural network. Thus, without training a separate neural network for each of the UDCs, image restoration may be performed for the UDCs of various specifications.

Similar to a noise parameter, the blur parameter 421 may have different values for respective pixels in the degraded image 410. For example, a first blur parameter may be determined for a first pixel in the degraded image 410. A graph 422 illustrates a PSF corresponding to the first blur parameter. The blur parameter 421 may include at least one of a first parameter value indicating a blur intensity, a second parameter value indicating an interval between artifacts (e.g., double images), or a third parameter value indicating an intensity of the artifacts.

In the graph 422, k1 denotes a width of a main lobe, which is also referred to as a blur bandwidth. In addition, k2 denotes a distance between the main lobe and a first side lobe, which is also referred to as a peak-to-peak distance. In addition, k3 denotes a size of a side lobe. Based on the size of the main lobe and the size of the side lobe, a peak-to-peak ratio between peaks may be derived. k1, k2, and k3 may correspond to a first parameter, a second parameter, and a third parameter of the blur parameter 421, respectively. When a value of k1 increases, the degraded image 410 may correspond to an image in which GT is more blurred, and thus k1 may indicate the blur intensity. In addition, based on a distance and ratio between peaks, the GT may be shown as artifacts in the degraded image 410, and thus k2 and k3 may indicate the interval between the artifacts and the intensity of the artifacts, respectively.

The image restoration apparatus may tune the blur parameter 421 based on a tuning condition, and apply the tuned blur parameter 421 that is obtained through the tuning to the image restoration network 401. In a case of using a blur map, the tuning of the blur parameter 421 may include tuning the blur map. For example, the image restoration apparatus may tune the blur parameter 421 based on the tuning condition, and transform the tuned blur parameter 421 into the blur map and apply the blur map to the image restoration network 401. Alternatively, the image restoration apparatus may transform the blur parameter 421 into the blur map and then tune the blur map based on the tuning condition.

The tuning condition may include a user preference. For example, the user preference may include a preferred noise level and a preferred blur level. In this example, the image restoration apparatus may tune the blur parameter 421 based on the preferred blur level. For example, in a case in which a user prefers a soft image with some blurs, the image restoration apparatus may tune the blur parameter 421 such that the blur parameter 421 indicates a low blur level. For example, the image restoration apparatus may decrease the first parameter value indicating the blur intensity. Thus, the image restoration network 401 may consider that there is a less blur in the degraded image 410 than an actual blur and perform a removal operation corresponding to the less blur. However, in a case in which a user prefers a sharp image with almost no blur, the image restoration apparatus may tune the blur parameter 421 such that the blur parameter 421 indicates a high blur level. Thus, the image restoration network 401 may consider that there is a greater blur in the degraded image 410 than an actual blur and perform a removal operation corresponding to the greater blur.

Figure 5:
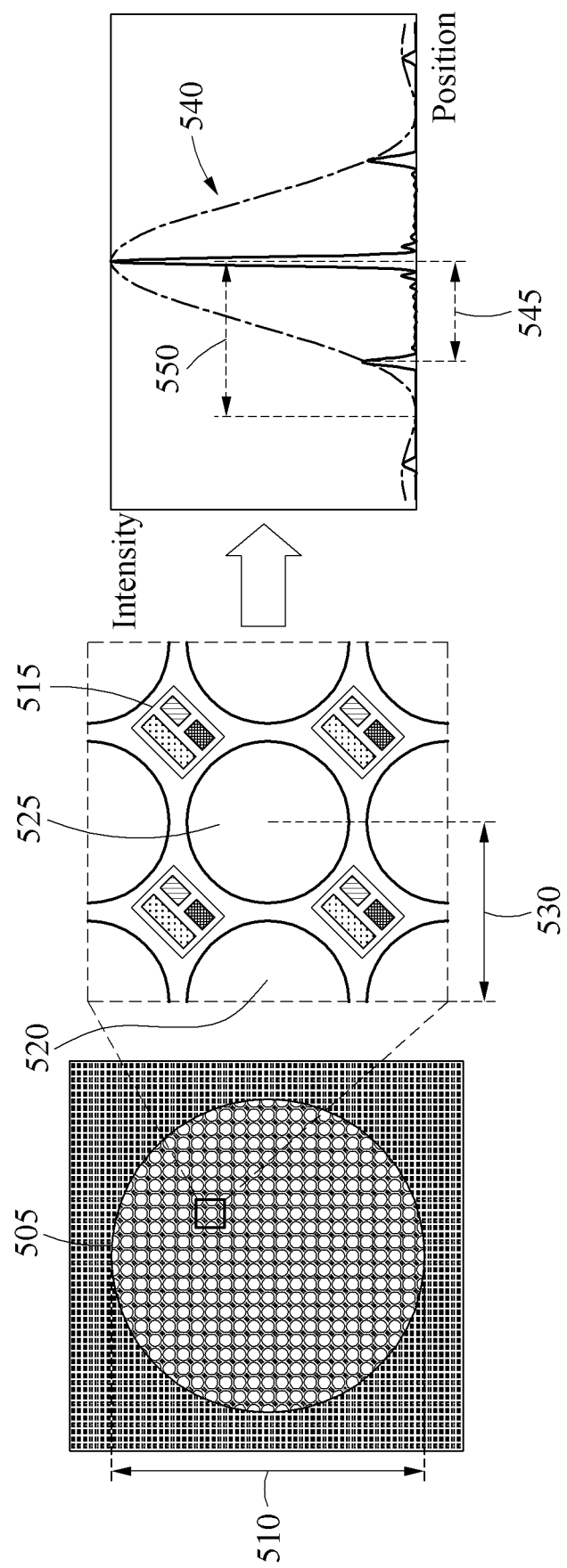
FIG. 5 illustrates an example of simulating a point spread function (PSF) for a hole pattern of an under-display camera (UDC).

FIG. 5 illustrates an example of simulating a PSF for a hole pattern of a UDC. Referring to FIG. 5, a region 505 of a display has a diameter 510, and holes 520 and 525 are arranged between pixels 515 in the region 505 according to a hole pattern. The hole pattern of the holes 520 and 525 may be determined based on at least one of a size, a shape, a depth, and an arrangement pattern (e.g., an interval between holes) of the holes 520 and 525. A PSF 540 may be simulated based on such a hole pattern.

The PSF 540 is a mathematical or numerical representation of how light corresponding to each pixel of a degraded image spreads. Here, the degraded image may correspond to a result of a convolution operation between a PSF of each pixel and GT. Thus, through the hole pattern of the holes 520 and 525 and/or the PSF 540, blur information associated with a blur that is to appear in the degraded image may be estimated. For example, the size of the holes 520 and 525 may determine a distance 550 between an x-intercept of an envelope of the PSF 540 and a main lobe of the PSF 540 and a shape of the envelope. An interval 530 between the neighboring holes 520 and 525 may determine a position and a size of a first side lobe. In addition, a ratio of an interval between neighboring holes (e.g., the holes 520 and 525) to the size of each of the holes (e.g., the holes 520 and 525) may determine the size of the first side lobe.

When the size of the holes 520 and 525 increases, the distance 550 between the x-intercept of the envelope and the main lobe may increase and the size of the first side lobe may decrease. When the interval 530 between the holes 520 and 525 decreases, a distance 545 between the main lobe and the first side lobe may increase and the size of the first side lobe may decrease. For example, when the interval 530 between the holes 520 and 525 is great, there may be a strong artifact or double image in the degraded image. In contrast, when the interval 530 between the holes 520 and 525 is small, there may be a strong blur in the degraded image. Based on such a characteristic of the PSF 540, a blur parameter for each UDC module may be determined. The image restoration apparatus may remove such an artifact and a blur from the degraded image using a corresponding blur parameter.

Figure 6:
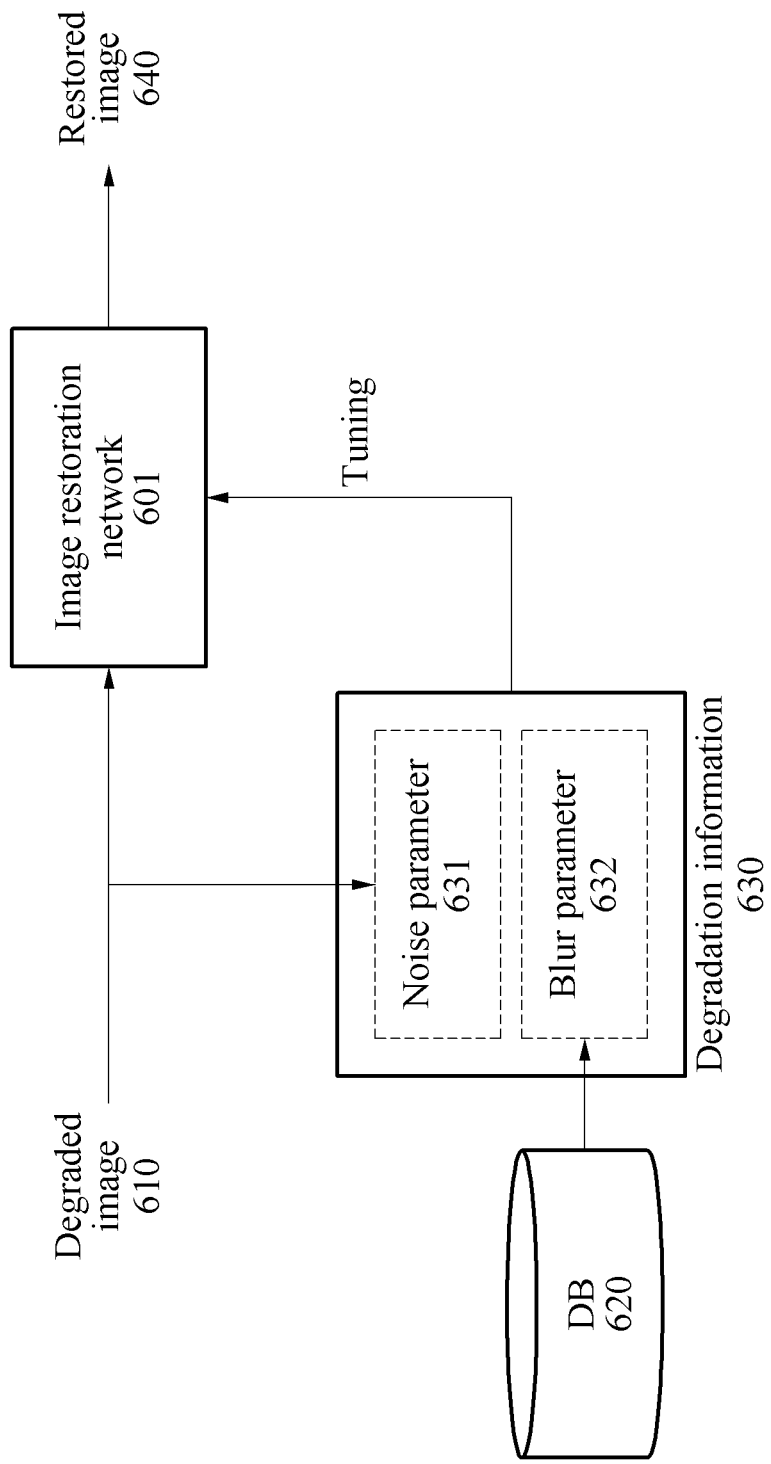
FIG. 6 illustrates an example of restoring a degraded image using both a noise parameter and a blur parameter.

FIG. 6 illustrates an example of restoring a degraded image using both a noise parameter and a blur parameter. Referring to FIG. 6, an image restoration apparatus may generate a restored image 640 by executing an image restoration network 601 with a degraded image 610 and degradation information 630. The degradation information 630 may include a noise parameter 631 and a blur parameter 632. The image restoration apparatus may estimate the noise parameter 631 by analyzing the degraded image 610, and obtain the blur parameter 632 from a DB 620. The image restoration apparatus may tune the degradation information 630 and execute the image restoration network 601 with the tuned degradation information 630. For example, the image restoration apparatus may tune the noise parameter 631 and/or the blur parameter 632 based on a tuning condition. The tuning condition may include environment information and/or a user preference.

The image restoration apparatus may use the degradation information 630 as input data of the image restoration network 601, or use the degradation information 630 to adjust an output of a layer of the image restoration network 601. The image restoration apparatus may generate map data corresponding to the noise parameter 631 and the blur parameter 632, and adjust output data of a layer of the image restoration network 601 using the map data. For example, the image restoration apparatus may generate a noise map corresponding to the noise parameter 631 and a blur map corresponding to the blur parameter 632, and adjust output data of a layer of the image restoration network 601 using the noise map and the blur map as map data. For another example, the image restoration apparatus may generate integrated map data by integrating the noise map and the blur map, and adjust the output data of the layer of the image restoration network 601 using the integrated map data.

Figure 7:
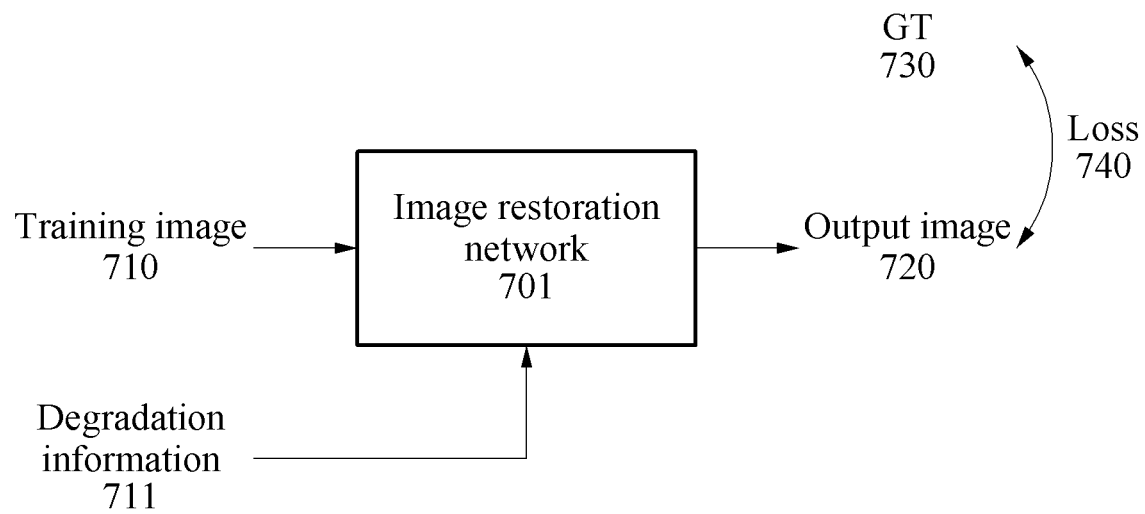
FIG. 7 illustrates an example of training an image restoration network.

FIG. 7 illustrates an example of training an image restoration network. Referring to FIG. 7, a training apparatus may execute an image restoration network 701 with a training image 710 and degradation information 711 and train the image restoration network 701 while updating the image restoration network 701 based on a loss 740 between an output image 720 and GT 730. The degradation information 711 may represent a degradation factor present in the training image 710. In such a training process, a parameter (e.g., a weight) of the image restoration network 701 may be continuously adjusted such that the loss 740 is reduced, and the image restoration network 701 may have a capability of generating the output image 720 that is similar to the GT 730 based on the training image 710 and the degradation information 711.

In an example, the training apparatus may generate the training image 710 by applying the degradation information 711 to the GT 730. For example, the training apparatus may perform a convolution operation between each pixel of the GT 730 and a corresponding value of the degradation information 711, and determine a result of the convolution operation to be the training image 710. To train the image restoration network 701 that restores a degraded image (e.g., a UDC image), configuring training data may need to be performed first. However, configuring the training data through actual capturing may not be easy. To configure UDC image-based training data, the capturing may need to be performed by alternating a UDC device having a UDC and a general device having a general camera, or be performed by alternating a state in which a display panel is combined with the UDC device and a state in which the display panel is removed from the UDC device. However, in such a process described in the foregoing, a movement, a fine vibration, a focal change, and the like may occur. Thus, by generating the training image 710 by applying the degradation information 711 to the GT 730, it is possible to configure the training data relatively simply and effectively.

Figure 8:
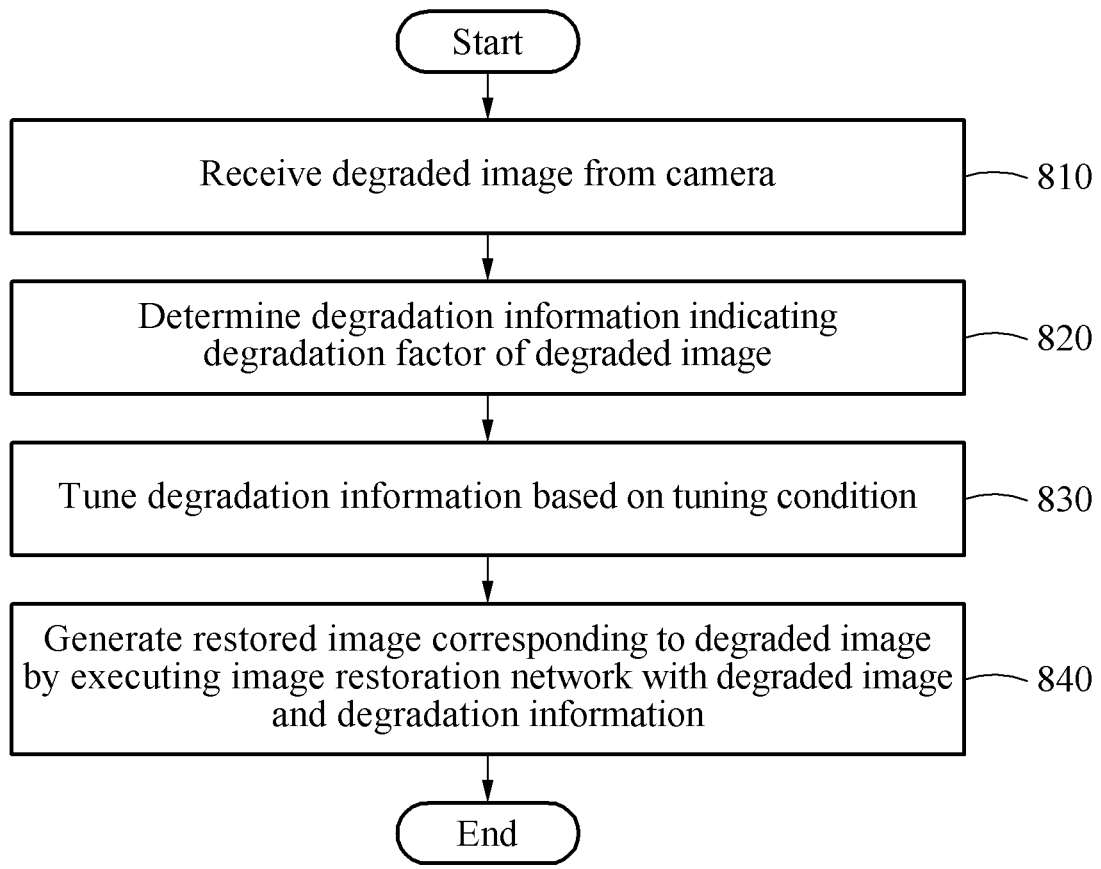
FIG. 8 illustrates an example of an image restoration method.

FIG. 8 illustrates an example of an image restoration method. Referring to FIG. 8, an image restoration apparatus receives a degraded image from a camera in operation 810, determines degradation information indicating a degradation factor of a degraded image in operation 820, tunes the degradation information based on a tuning condition in operation 830, and generates a restored image corresponding to the degraded image by executing an image restoration network with the degraded image (e.g., a UDC image) and the degradation information in operation 840. For a more detailed description of the operations performed by the image restoration apparatus, reference may be made to what has been described above with reference to FIGS. 1 through 7.

Figure 9:
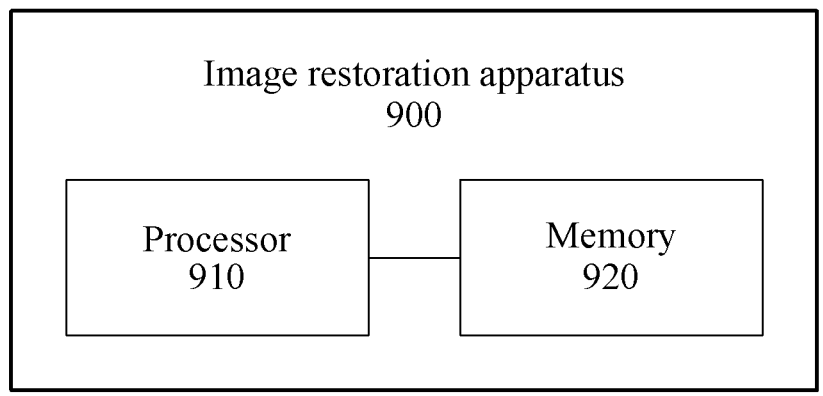
FIG. 9 illustrates an example of an image restoration apparatus.

FIG. 9 illustrates an example of an image restoration apparatus. Referring to FIG. 9, an image restoration apparatus 900 includes a processor 910 and a memory 920. The memory 920 may be connected to the processor 910, and store instructions executable by the processor 910, data to be processed by the processor 910, or data processed by the processor 910. The memory 920 may be a non-transitory computer-readable medium, for example, a high-speed random-access memory (RAM) and/or nonvolatile computer-readable storage medium (e.g., at least one disk storage device, flash memory device, or other nonvolatile solid-state memory devices).

The processor 910 may execute the instructions stored in the memory 920 to perform the operations described above with reference to FIGS. 1 through 8. In an example, the processor 910 may receive a degraded image from a camera, determine degradation information indicating a degradation factor of the degraded image, tune the degradation information based on a tuning condition, and generate a restored image corresponding to the degraded image by executing an image restoration network with the degraded image and the degradation information. For a more detailed description of the image restoration apparatus 900, reference may be made to what has been described above with reference to FIGS. 1 through 8.

Figure 10:
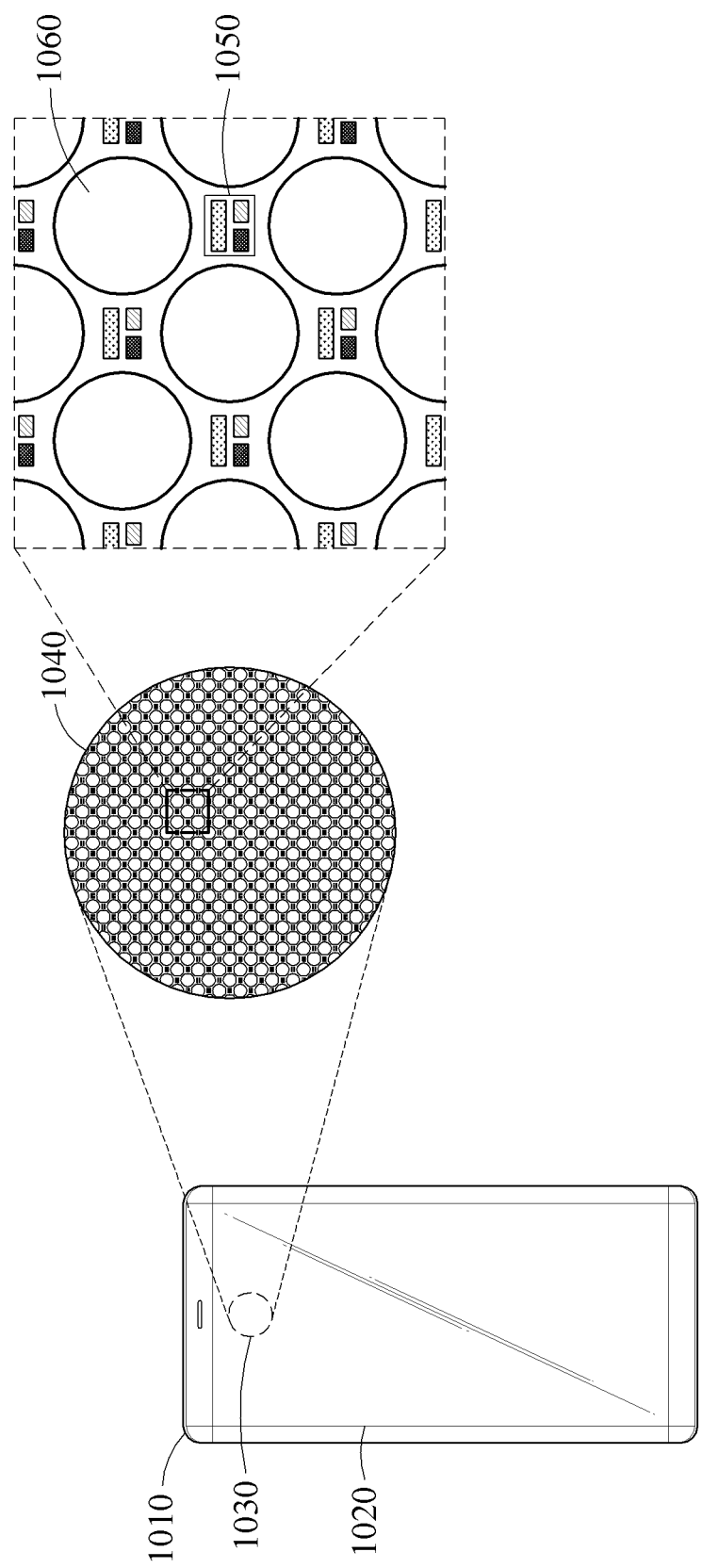
FIG. 10 illustrates an example of an electronic device providing a UDC.

FIG. 10 illustrates an example of an electronic device providing a UDC. Referring to FIG. 10, an electronic device 1010 includes a UDC disposed under a region 1030 of a display 1020. As a camera is disposed inside the electronic device 1010, it is possible to include, as a display region, a camera region that is used to be allocated for the exposure of the camera. Thus, it is possible to provide the display 1020 in a complete rectangular shape without a need to provide a display shape as a notch or to allocate the camera region in the display region, in order to obtain a maximum size of the display region. Although a smartphone is illustrated in FIG. 10 as an example of the electronic device 1010, the electronic device 1010 may be a device including the display 1020 in addition to the smartphone.

A display region 1040 illustrates an enlarged display panel of the region 1030, and includes display pixels 1050 and holes 1060. The shape of a hole 1060 may not be limited to a circle, but be provided in various shapes such as an ellipse and a rectangle. A hole 1060 may also be referred to as a micro-hole. The display pixels 1050 and the holes 1060 may be arranged in a certain pattern in the region 1030. Such an arrangement pattern may be referred to as a hole pattern. For example, the holes 1060 may be arranged among the display pixels 1050 to be as close as possible to the display pixels 1050. The UDC may generate an image (e.g., a degraded image or a UDC image) based on light provided after passing through the holes 1060 from the outside of the electronic device 1010. The display pixels 1050 may output a panel image along with other display pixels outside the display region 1040.

Figure 11:
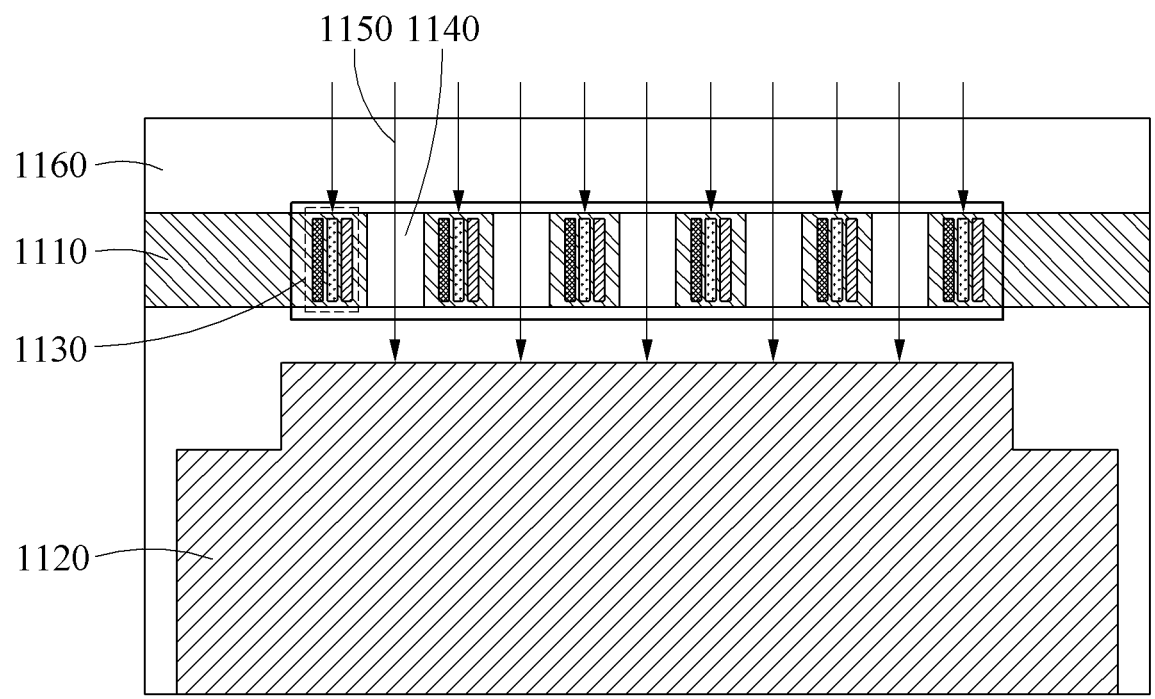
FIG. 11 illustrates an example of an arrangement of a display panel and a UDC.

FIG. 11 illustrates an example of an arrangement of a display panel and a UDC. FIG. 11 is a cross-sectional view of the region 1030 of FIG. 10. Referring to FIG. 11, a display panel 1110 may include display pixels 1130 that represent colors and holes 1140 that allow external light 1150 to pass therethrough. The display pixels 1130 and the holes 1140 may be alternately arranged. Each of the display pixels 1130 may include sub-pixels each sensing a certain color.

On the display panel 1110, a protective layer 1160 of a transparent material may be arranged to protect the display panel 1110. The protective layer 1160 may be tempered glass or reinforced plastic, for example. The display panel 1110 may include other various components to implement the display panel 1110 in addition to the display pixels 1130. Through these components, it is possible to implement a display type, such as, for example, a liquid crystal display (LCD) and an organic light-emitting diode (OLED).

An image sensor 1120 may be arranged under the display panel 1110 and generate an image (e.g., a degraded image or a UDC image) by sensing the external light 1150 transmitted through the holes 1140. The image sensor 1120 may be designed to be ultra-small and provided as a plurality of image sensors. The light 1150 reaching the image sensor 1120 may be a portion of incident light on the display panel 1110, which is transmitted through the holes 1140. Thus, a UDC image generated by the image sensor 1120 may be low in brightness and include a relatively great amount of noise. In addition, each of the holes 1140 may act as a slit, and thus the UDC image may have a blur due to the diffraction of light. Such degradation factors that degrade an image quality of the UDC image may be removed through image restoration specialized for the USD image.

Figure 12:
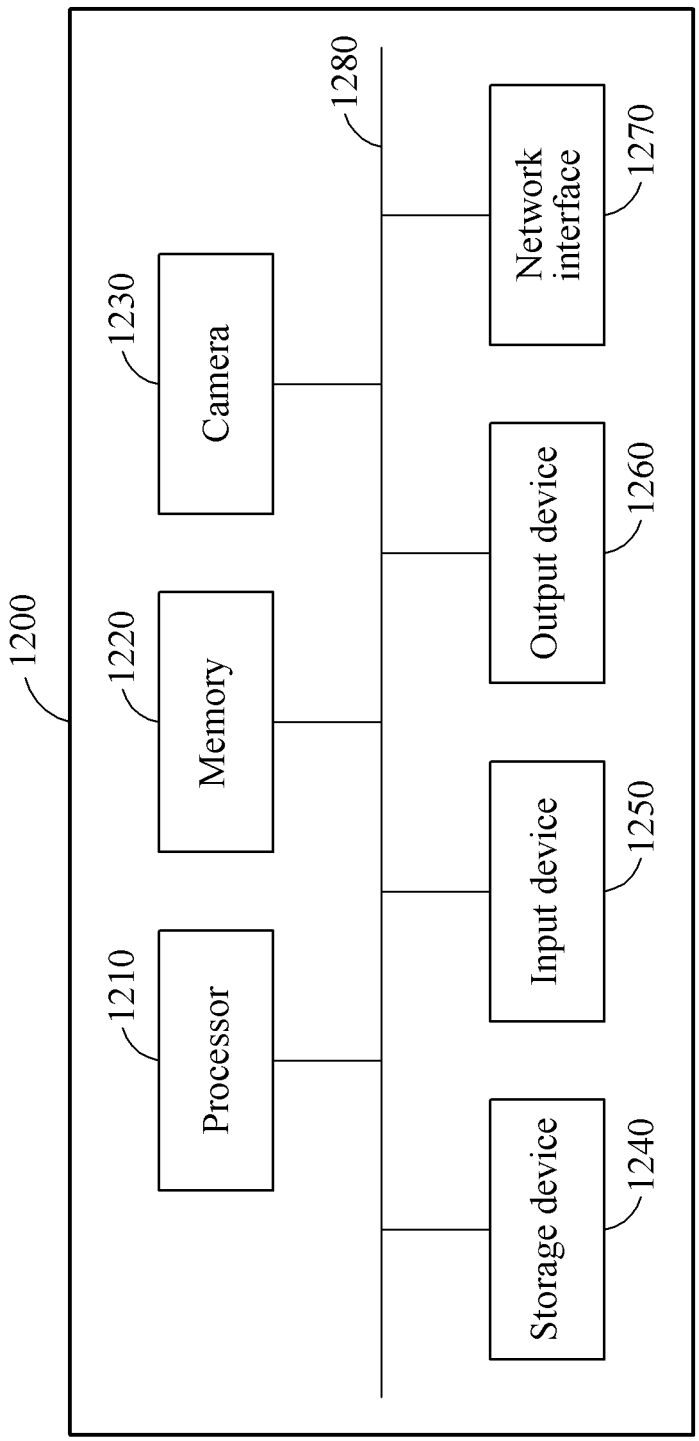
FIG. 12 illustrates an example of an electronic device.

FIG. 12 illustrates an example of an electronic device. Referring to FIG. 12, an electronic device 1200 includes a processor 1210, a memory 1220, a camera 1230, a storage device 1240, an input device 1250, an output device 1260, and a network interface 1270, which may communicate with one other through a communication bus 1280. For example, the electronic device 1200 may be embodied as at least a portion of a mobile device (e.g., a mobile phone, a smartphone, a personal digital assistant (PDA), a netbook, a tablet computer, a laptop computer, etc.), a wearable device (e.g., a smart watch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., a smart vehicle, etc.).

The electronic device 1200 may generate an image (e.g., a degraded image and/or a UDC image) and generate a restored image by restoring the generated image. In addition, the electronic device 1200 may perform a subsequent operation associated with image restoration, for example, user verification. The electronic device 1200 may correspond to the electronic device 1010 of FIG. 10, or structurally and/or functionally include the image restoration apparatus 100 of FIG. 1 and/or the image restoration apparatus 900 of FIG. 9.

The processor 1210 may execute functions and instructions to be executed in the electronic device 1200. The processor 1210 may process instructions stored in the memory 1220 or the storage device 1240. The processor 1210 may perform one or more, or all, of the operations described above with reference to FIGS. 1 through 11.

The memory 1220 may store data for face detection. The memory 1220 may include a computer-readable storage medium or device. The memory 1220 may store the instructions to be executed by the processor 1210, and store related information during the execution of software and/or an application by the electronic device 1200.

The camera 1230 may capture an image and/or a video. For example, the camera 1230 may be a UDC. The UDC may be provided under a display panel, and generate a UDC image based on light received through holes arranged between display pixels. For example, the UDC image may include a face of a user. In this example, through image restoration of the UDC image, user verification may be performed based on the face of the user. The camera 1230 may be a three-dimensional (3D) camera that provides a 3D image including depth information of objects.

The storage device 1240 may include a computer-readable storage medium or device. The storage device 1240 may store a greater amount of information for a longer period of time than the memory 1220. The storage device 1240 may include, for example, a magnetic hard disk, an optical disc, a flash memory, a floppy disk, or a nonvolatile memory of another form that is known in the relevant technical field.

The input device 1250 may receive an input from a user by a traditional input method through a keyboard and a mouse, and by a new input method, such as, for example, a touch input, a voice input, and an image input. The input device 1250 may include, for example, a keyboard, a mouse, a touchscreen, a microphone, and other devices that may detect the input from the user and transfer the detected input to the electronic device 1200.

The output device 1260 may provide an output of the electronic apparatus 1200 to a user through a visual, auditory, or tactile channel. The output device 1260 may include, for example, a display, a touchscreen, a speaker, a vibration generator, and other devices that may provide the output to the user. The network interface 1270 may communicate with an external device through a wired or wireless network.

The image restoration apparatus, the training apparatus, the electronic device, and other apparatuses, devices, units, modules, and components described herein with respect to FIGS. 9-12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented image restoration method comprising:
   receiving a degraded image;
   determining a parameter that represents information of each pixel in the degraded image, the parameter comprising a blur parameter determined based on an interval between holes arranged between display pixels of an under-display camera (UDC);
   tuning the parameter based on a tuning condition including one or both of environment information of the degraded image and a user preference; and
   generating a restored image corresponding to the degraded image by adjusting, by removing a component indicated through a map in output data of at least one hidden layer of an image restoration network using an operation between the output data and the parameter, the output data, the output data being generated based on the degraded image, and the map being generated by transforming the parameter into the map.

2. The image restoration method of claim 1, wherein the user preference corresponds to a level of removal of a degradation factor of the degraded image.

3. The image restoration method of claim 1, wherein the generating of the restored image comprises:
   inputting, to the image restoration network, input data corresponding to the degraded image; and
   adjusting the output data of the at least one hidden layer of the image restoration network using map data corresponding to the tuned parameter.

4. The image restoration method of claim 1, wherein determining the parameter comprises:
   analyzing the degraded image and representing a noise level in the degraded image by a normal distribution $N(0, \sigma)$, in which $\sigma$ is a noise parameter for each pixel.

5. The image restoration method of claim 4, wherein tuning the parameter comprises:
   tuning the noise parameters based on environment information of the degraded image.

6. The image restoration method of claim 5, wherein tuning the noise parameters comprises:
 in response to the environment information corresponding to a low-illumination environment, tuning the noise parameters such that the noise parameters indicate a high noise level; and
 in response to the environment information corresponding to a high-illumination environment, tuning the noise parameters such that the noise parameters indicate a low noise level.

7. The image restoration method of claim 1, wherein the degraded image is captured by the UDC, wherein the determining the parameter comprises:
 obtaining the blur parameter corresponding to a hardware characteristic of the UDC.

8. The image restoration method of claim 7, wherein the UDC is configured to receive light through the holes arranged between the display pixels of a display panel,
 wherein the hardware characteristic includes at least one or more of a size, a shape, a depth, and an arrangement pattern of the holes.

9. The image restoration method of claim 7, wherein the blur parameter includes one or more of a first parameter indicating a blur intensity, a second parameter indicating an interval between artifacts, and a third parameter indicating an intensity of the artifacts.

10. A non-transitory computer-readable storage medium storing instructions that, when executed by a processor, cause the processor to perform the image restoration method of claim 1.

11. An image restoration apparatus comprising:
 a processor; and
 a memory including instructions executable in the processor,
 wherein, when the instructions are executed in the processor, the processor is configured to:
 receive a degraded image;
 determine a parameter that represents information of each pixel in the degraded image, the parameter comprising a blur parameter determined based on an interval between holes arranged between display pixels of an under-display camera (UDC);
 tune the parameter based on a tuning condition including one or both of environment information of the degraded image and a user preference; and
 generate a restored image corresponding to the degraded image by adjusting, by removing a component indicated through a map in output data of at least one hidden layer of an image restoration network using an operation between the output data and the parameter, the output data, the output data being generated based on the degraded information, and the map being generated by transforming the parameter into the map.

12. The image restoration apparatus of claim 11, wherein the processor is configured to:
 analyze the degraded image and represent a noise level in the degraded image by a normal distribution $N(0, \sigma)$, in which $\sigma$ is a noise parameter for each pixel.

13. The image restoration apparatus of claim 12, wherein the processor is configured to:
 tune the noise parameters based on environment information of the degraded image.

14. The image restoration apparatus of claim 11, wherein the degraded image is captured by the UDC,
 wherein the processor is configured to:
 determine the blur parameter corresponding to a hardware characteristic of the UDC.

15. The image restoration apparatus of claim 14, wherein the UDC is configured to receive light through the holes arranged between the display pixels of a display panel, and
 the hardware characteristic includes one or more of a size, a shape, a depth, and an arrangement pattern of the holes.

16. An electronic device comprising:
 an under-display camera (UDC); and
 a processor configured to receive a degraded image from the UDC, determine a parameter that represents information of each pixel in the degraded image, the parameter comprising a blur parameter determined based on an interval between holes arranged between display pixels of the UDC, tune the parameter based on a tuning condition including one or both of environment information of the degraded image and a user preference, and generate a restored image corresponding to the degraded image by adjusting, by removing a component indicated through a map in output data of at least one hidden layer of an image restoration network using an operation between the output data and the parameter, the output data, the output data being generated based on the degraded image, and the map being generated by transforming the parameter into the map.

17. The electronic device of claim 16, wherein the processor is configured to:
 analyze the degraded image; and
 represent a noise level in the degraded image by a normal distribution $N(0, \sigma)$, in which $\sigma$ is a noise parameter for each pixel.

18. The electronic device of claim 16, wherein the UDC is provided under a display panel and configured to generate an image based on light received through the holes arranged between the display pixels of the display panel,
 wherein the processor is configured to determine the blur parameter corresponding to a hardware characteristic of the UDC, and
 wherein the hardware characteristic includes one or more of a size, a shape, a depth, and an arrangement pattern of the holes.

* * * * *